United States Patent
Wittenstein et al.

(10) Patent No.: US 6,218,829 B1
(45) Date of Patent: Apr. 17, 2001

(54) LINEAR DRIVE HAVING A DEVICE FOR REGISTERING THE DISPLACEMENT TRAVEL AND/OR POSITION

(75) Inventors: Manfred Wittenstein, Bad Mergentheim; Hans-Hermann Spohr, Calw, both of (DE)

(73) Assignee: Wittenstein Motion Control GmbH, Igersheim (DE)

( * ) Notice: Subject to any disclaimer, the term of this patent is extended or adjusted under 35 U.S.C. 154(b) by 0 days.

(21) Appl. No.: 09/202,389

(22) PCT Filed: Jun. 12, 1997

(86) PCT No.: PCT/DE97/01185

§ 371 Date: Dec. 11, 1998

§ 102(e) Date: Dec. 11, 1998

(87) PCT Pub. No.: WO97/47949

PCT Pub. Date: Dec. 18, 1997

(30) Foreign Application Priority Data

Jun. 14, 1996 (DE) .............................................. 196 23 742

(51) Int. Cl.[7] ...................................................... G01B 7/14
(52) U.S. Cl. ................................ 324/207.21; 324/207.24; 702/158
(58) Field of Search ........................... 324/207.2, 207.21, 324/207.24, 207.25, 207.14, 207.13; 74/89.15; 338/324, 32 R; 702/158

(56) References Cited

U.S. PATENT DOCUMENTS

| | | | |
|---|---|---|---|
| 4,715,241 | * 12/1987 | Lipinski et al. | 74/89.15 |
| 4,725,776 | 2/1988 | Onodera et al. | . |
| 5,090,489 | * 2/1992 | Ettori | 173/165 |
| 5,299,143 | * 3/1994 | Hellinga et al. | 364/561 |
| 5,315,244 | * 5/1994 | Griebeler | 324/207.21 |

FOREIGN PATENT DOCUMENTS

| | | |
|---|---|---|
| 1 262 621 | 3/1968 | (DE) . |
| 39 35 261 | 5/1990 | (DE) . |
| 42 10 934 | 7/1993 | (DE) . |
| 195 33 964 | 3/1996 | (DE) . |
| 0 109 296 | 5/1984 | (EP) . |
| 2 205 406 | 12/1988 | (GB) . |
| 57 046 670 | 3/1982 | (JP) . |
| 2-62454 | 3/1990 | (JP) . |

* cited by examiner

*Primary Examiner*—Christine Oda
*Assistant Examiner*—Subhash Zaveri
(74) *Attorney, Agent, or Firm*—Collard & Roe, P.C.

(57) ABSTRACT

A device for registering the displacement travel and/or the displaced position of a sliding component, which is moved free of torsion, of a linear drive is intended to be implemented on a small scale and with display precision. For this purpose, the device is equipped with at least two magneto-resistive sensors which act within a separate magnetic field, respectively assigned to the displacement component in different regions located one behind the other.

3 Claims, 5 Drawing Sheets

Figure 1:
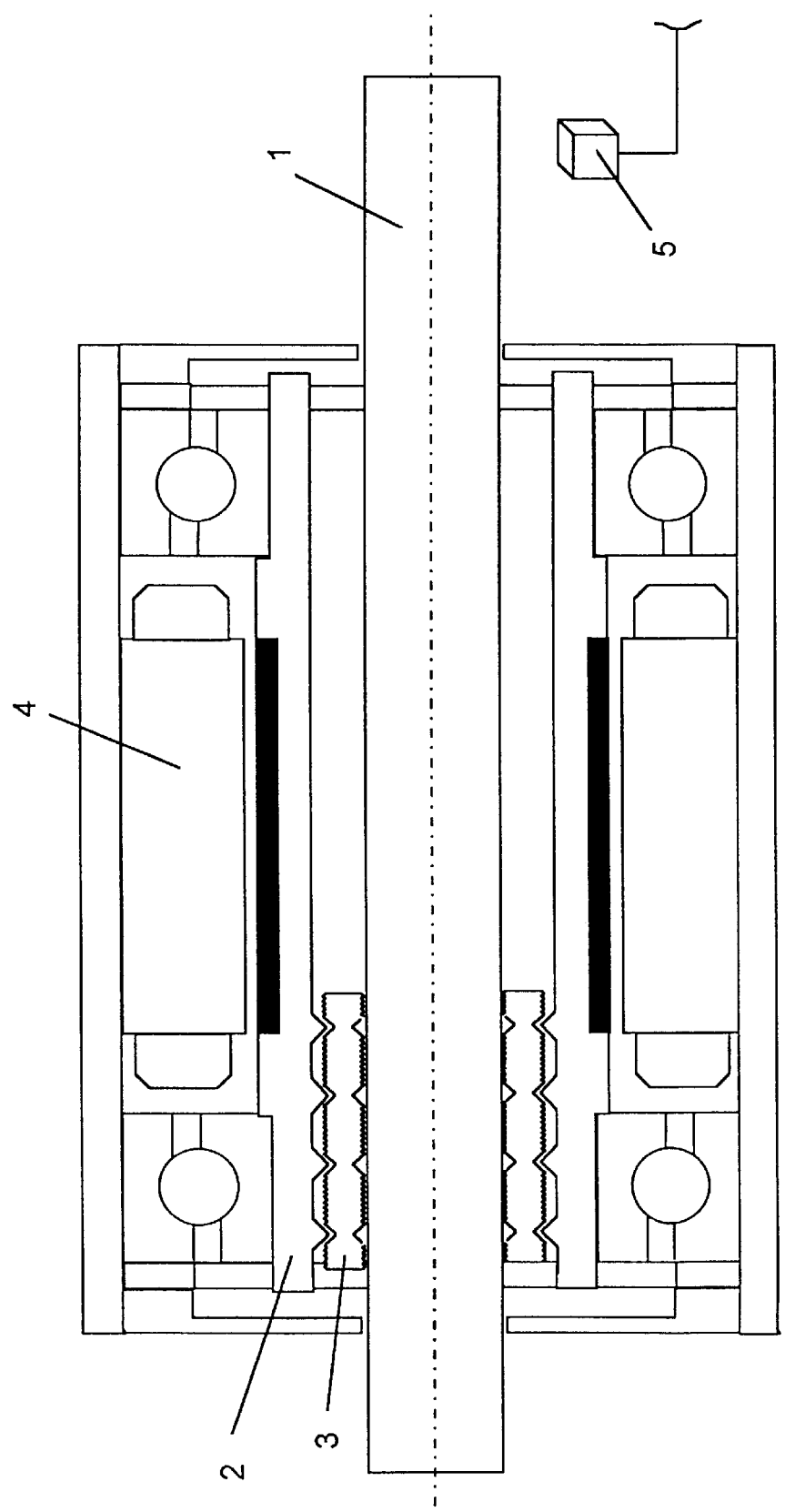

LINEAR DRIVE HAVING A DEVICE FOR REGISTERING THE DISPLACEMENT TRAVEL AND/OR POSITION

The invention relates to a linear drive having a device for registering the displacement travel and/or position, in particular in a small-scale linear drive according to the preamble of Patent claim 7.

Devices for registering the displacement travel and/or position of two components which can be displaced with respect to one another are already known in various embodiments such as, for example, DE 42 10 934 C1, DE 39 35 261 A1, DE-C 12 62 621 and JP 2-62454 A., In: Patent Abstracts of Japan, M-976, May 21, 1990, Vol. 14, No. 237.

These devices have an overall complicated structure and can, in particular, not be implemented on a very small scale either.

A device of similar generic type in which, however, only one sensor is used is known from U.S. Pat. No. 4,725,776. Only incremental registering of the displacement travel is possible with this device.

In devices of the generic type according to EP 0 109 296 A2 and GB 22 05 406 A, absolute registering of position is already possible by means of magneto-resistive sensors. For this purpose, in said publications, sensors are assigned different profile regions. The structural expenditure which is necessary for this is large.

The invention is concerned with the problem of implementing on as small a scale as possible and in a simple constructed fashion a linear drive device of the generic type with a high degree of display precision.

A solution in this respect is shown by the characterizing feature of claim 7.

Expedient refinements are the subject-matter of the subclaims. These are explained in more detail with reference to an exemplary embodiment.

According to the invention, in a linear drive for measuring the displacement travel and the displaced position of the sliding component of this drive, a drive profile in particular which may, per se, possibly already be present on the sliding component can be employed for changing a magnetic field using a magneto-resistive sensor, and this change in the magnetic field can in turn as one of two evaluation criteria, be evaluated in order to determine the displacement travel and the absolute displaced position. The drive profile of a sliding component, implemented for example as a spindle or sliding sleeve, is here either threaded or grooved with identical intervals between the grooves. The grooved or threaded profile is in particular such that there are profile faces inclined with respect to the longitudinal axis of displacement as far as possible in all regions in the longitudinal direction. Otherwise, the measurement precision suffers. For example, a thread with an approximately triangular threaded profile cross section with the profile triangles arranged directly in a row in the longitudinal direction of displacement is ideal for the device according to the invention.

With a relatively fine drive profile of a sliding component, that is to say, for example, with a fine threaded profile with which small amounts of displacement travel can be obtained with high transmission ratios, an extremely sensitive magneto-resistive sensor, which is known per se, is used for precise displacement travel measurement and evaluation.

Such a sensor is also assigned to the region of the second type of profiling of the sliding component, the second type of profiling having to satisfy the same set of requirements as the previously described drive profile.

These sensors are placed in a magnetic field whose configuration depends, inter alia, on the position of the sliding component. For this purpose, each of the individual sensors is aligned with respect to the surface of the drive profile, for example a fine thread of the spindle of a spindle drive, or of the second type of profiling, in such a way that a displacement of the edges of the threaded profile or of the second type of profiling through the magnetic field makes it possible electronically to register and image the displacement which has taken place. Electronic registration and imaging of the displacement of the drive profile of the spindle or of the spindle region with the second type of profiling means that the peaks and valleys of the drive profile of the spindle which are displaced past the sensor are correspondingly registered and evaluated. Thus, it is possible to determine absolutely the position of the sliding component in an extremely simple way.

If a linear drive is driven by means of an electrical servomotor, which is a brushless, permanent-magnet-excited servomotor, in a linear drive with very little play the magnetic field sensor which is used for measuring travel and position can simultaneously be used to commutate this motor.

Moreover, the values determined with the device for registering the travel and/or position according to the invention can be used for the open-loop and closed-loop control of the motor of the linear drive which is, in particular, an electric motor.

Using magneto-resistive magnetic field sensors as magneto-resistive length measuring elements is known per se. In this respect, reference is made, for example, to the following documents: "in Nanometerschritten" [In nanometer increments], Konstruktion & Elektronik [Design and Electronics], No. 26/27 of 16.12.1992, page 8; digitale Längen- und Winkelmeßtechnik" [Digital length and angle measuring technology], verlag moderne industrie [Modern industry publishing house], 2nd Edition 1991; F. Dettmann, U. Loreit "Positionsmessung mit magnetoresistiven Sensoren" [Position measurement with magneto-resistive sensors] Symposium magnetoresistive Sensoren [Symposium of magneto-resistive sensors] 25.06.92 in Dortmund.

Figure 2:
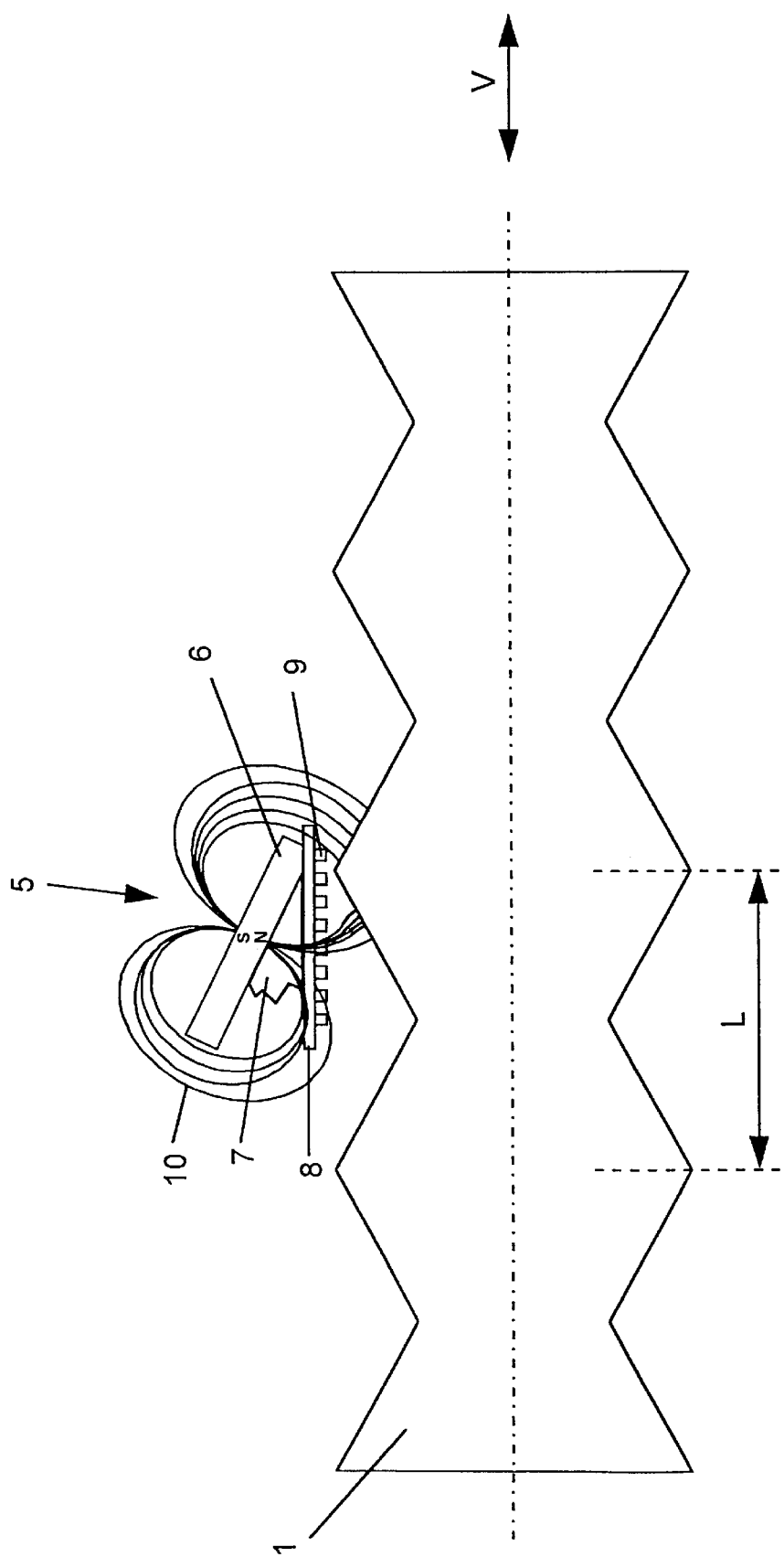
Figure 3:
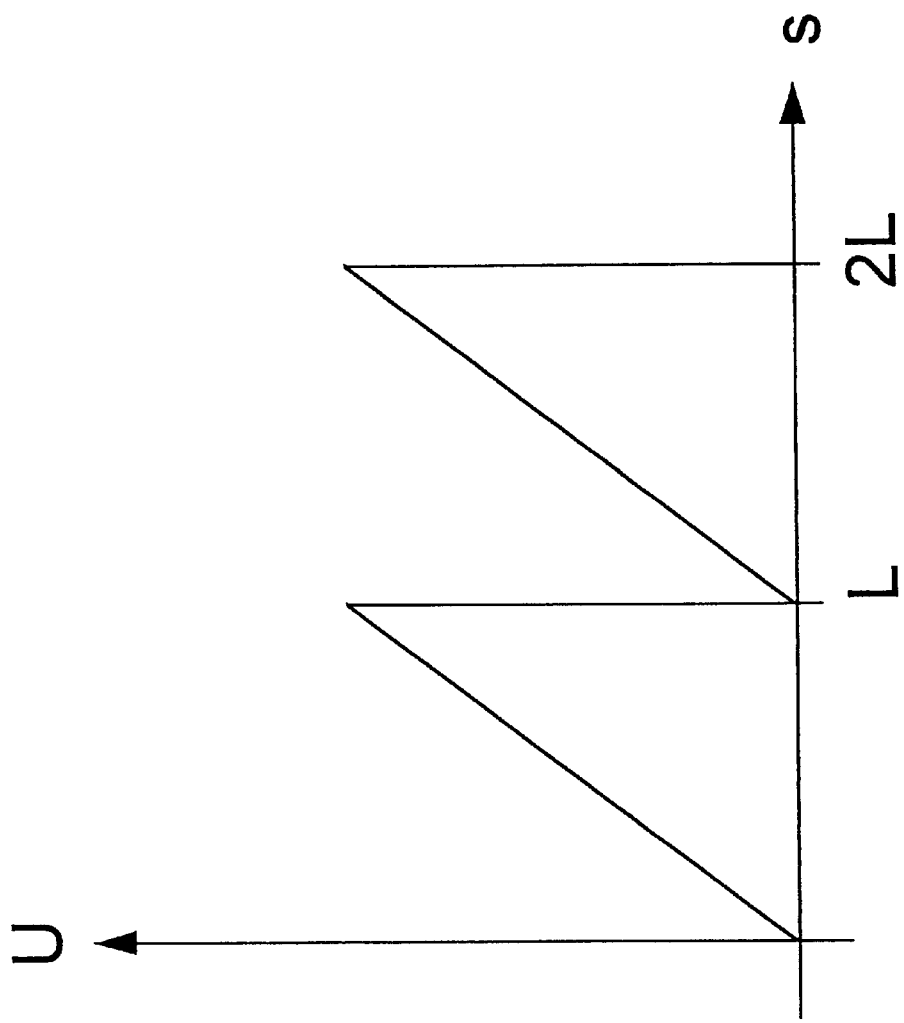
Figure 4:
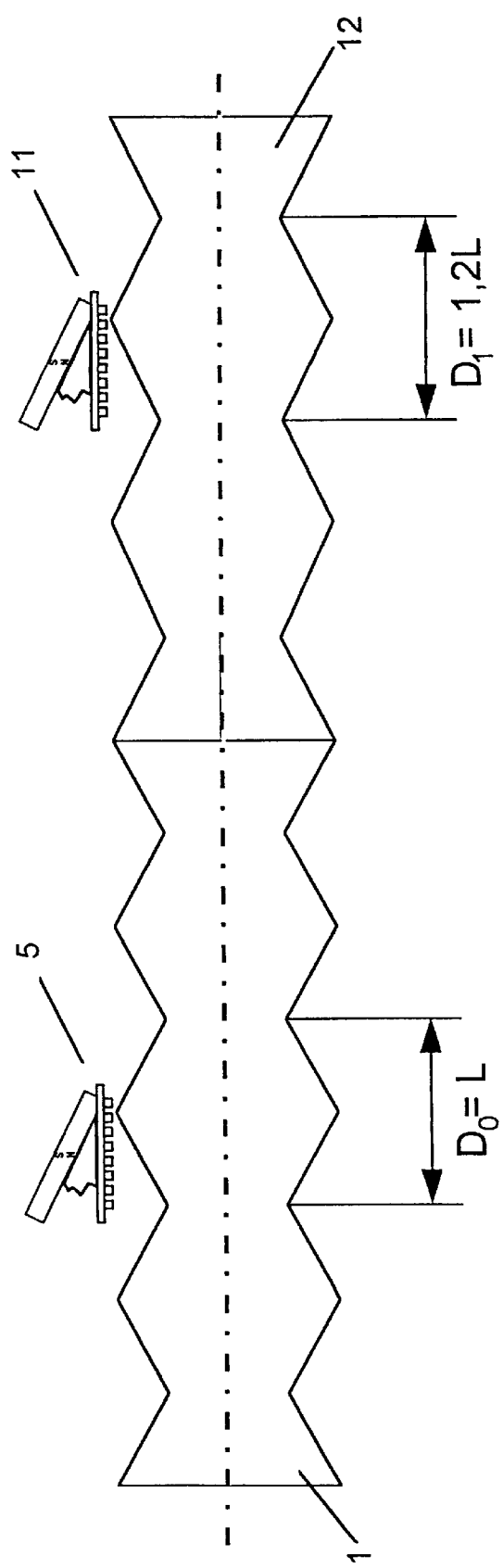
Figure 5:
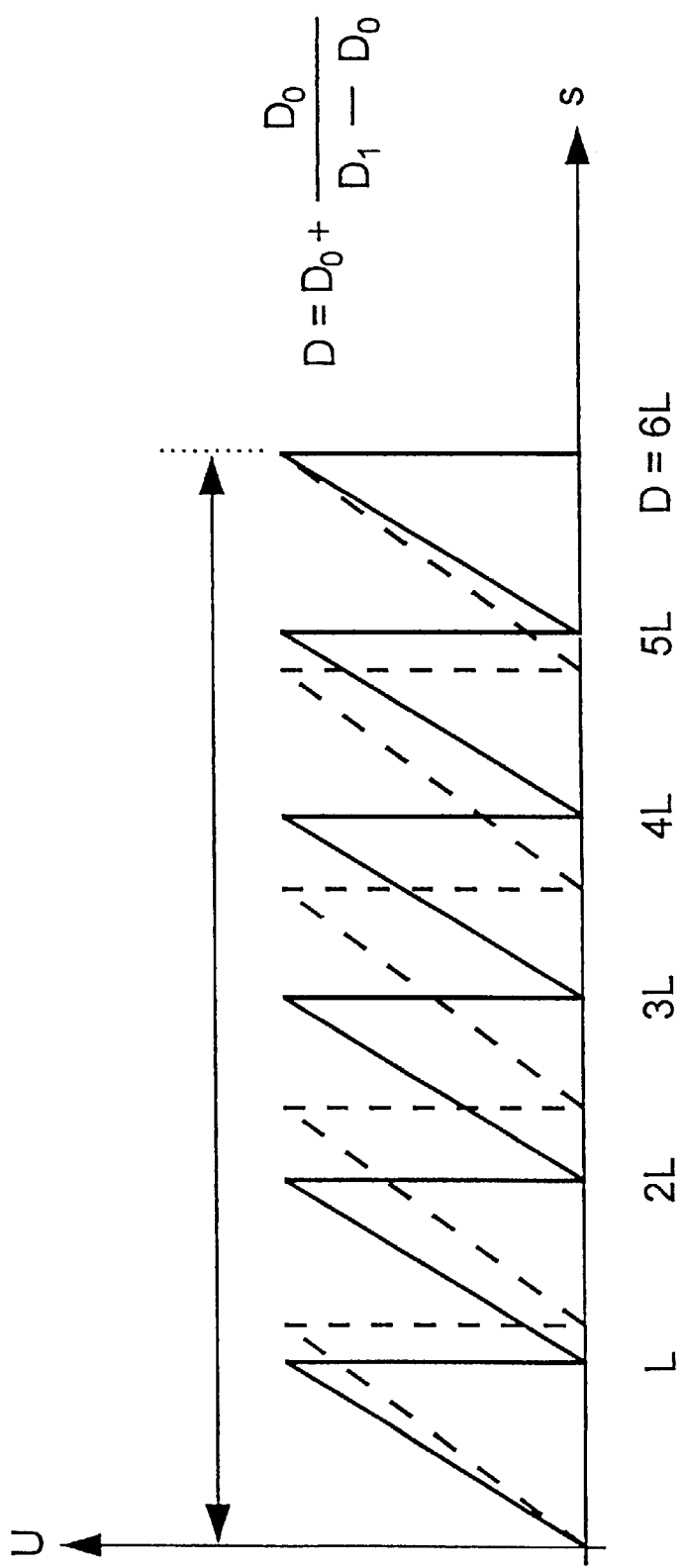

The invention is explained below in more detail with reference to drawn models and various functional diagrams, and a particularly advantageous exemplary embodiment is also specified. In said drawing:

FIG. 1 shows a schematic sectional view of a planetary roller-type spindle drive as linear drive device, FIG. 2 shows the arrangement of a magnetic field sensor with reference to the profile of a spindle with qualitative representation of the magnetic field, FIG. 3 shows a diagram with electronic imaging of the intervals between the profile peaks of a longitudinally displaced spindle, FIG. 4 shows the arrangement of two magnetic field sensors with reference to a spindle which is extended by a driver spindle and has different pitch values of the two spindles, as a preferred exemplary embodiment of the invention, FIG. 5 shows a diagram with the electronic imaging of the intervals between the profile peaks of the actual spindle on the one hand and of the driver spindle on the other from the exemplary embodiment according to FIG. 4.

The spindle drive which is described here as an explanatory example of a linear drive is a planetary roller-type spindle drive such as is known, for example, from EP 0 320 621 B1. In particular, it is composed of a threaded spindle rod 1, which is driven by a fixedly mounted spindle nut 2 via intermediately connected planetary rollers 3. The spindle rod 1 is provided with a fine thread. The spindle nut 2 has coarse grooving. The planetary rollers 3 have, in overlapping configuration, a fine grooving which engages in the thread of the spindle rod 1 and a coarse grooving which engages in the spindle nut 2. The spindle rod 1 is mounted fixed in terms of rotation and thus executes a linear movement when the spindle nut 2 is driven. The spindle nut 2 is a component of the rotor of an electric AC servomotor which is integrated into the spindle drive and which is a brushless, permanent-magnet-excited servomotor 4.

A magneto-resistive sensor 5 is provided for registering the displacement travel of the spindle rod 1 and is directed radially towards it. The specific design of this sensor 5 and its arrangement with respect to the spindle rod 1 are shown by FIG. 2.

According to said figure, the sensor 5 comprises a permanent magnet 6, which is attached to a plate-shaped carrier substrate 8 by means of adhesive 7, and a magneto-resistive sensor active-layer 9. The sensor active-layer 9 is provided on the side of the plate-shaped carrier substrate 8 facing the spindle rod 1, while the permanent magnet 6 is located on the opposite side. The plate-shaped carrier substrate 8 runs approximately parallel to the axis of the spindle rod 1. The axis of the poles of the permanent magnet 6 is inclined at an obtuse angle with respect to the axis of the spindle rod 8. The north and south poles of the permanent magnet 6 are indicated by N and S. With the involvement of the threaded profile of the spindle rod 1 which is composed of magnetizable material, the permanent magnet 6 generates a magnetic field 10. This magnetic field 10 is indicated qualitatively by the circular field lines which have been drawn. The direction of displacement of the spindle rod 1 is indicated by a double arrow V. The distance between two successive profile peaks of the threaded rod 1 is defined as L.

When the fixedly arranged sensor 5 passes through the magnetic field 10, the spindle rod 1, which is mounted free of torsion, generates a type of electronic imaging of the intervals between the threaded profile peaks corresponding to the representation in the diagram in FIG. 3. Here, s indicates the displacement travel of the spindle rod 1 and U the voltage of an electronic evaluation device which is connected to the magneto-resistive sensor 5. When the measurement signals are evaluated, an arc-tan interpolation is performed.

The way in which such electronic imaging can, in particular, be generated in practice with a magneto-resistive sensor 5 is the prior art, for which reason there is no need to give the details of this here. Reference is expressly made here once more to the literature examples which have already been given above.

By starting from a zero position of the spindle rod 1 and continuously counting the thread peaks and valleys which are electronically imaged as the spindle rod 1 is displaced along the sensor 5 (incremental method), it is possible in a known fashion, with the aid of an electronic memory, to register and specify not only the respective relative displacement travel of the spindle rod 1 but also its absolute axial position.

For absolute axial measurement of the position of the spindle rod 1 it is necessary to use two magnato-resistive sensors in each case. One of these is assigned to the threaded profile of the spindle rod 1 by means of a magnetic field and is matched to the pitch of this threaded profile. The second sensor is assigned as supplementary sensor 11, likewise by means of a magnetic field, to a driver which is permanently connected to the spindle rod 1 and has a thread with a pitch which differs from the spindle rod 1.

An exemplary embodiment according to the invention of this is shown in FIG. 4 in which the driver is an axial extension in the form of a driver spindle 12. This driver spindle 12 may be a one-piece component of the spindle rod 1 and may differ from the latter merely in a slightly different pitch. The different pitches are given in FIG. 4 by $D_o=L$ for the spindle rod 1, and by $D_1=1.2 \, L$ for the driver spindle 12.

By superimposing the respectively determined electronic imaging of the displacement travels it is possible to determine an absolute position of the spindle rod 1 over a specific displacement travel distance D. For an explanation, please refer to the electronic imaging of the electronically evaluated measured value curves which are determined by means of the two sensors 5 and 11 and to the superimposition of the said curves, in the view in FIG. 5. Here, the electronic evaluation curves of the two sensors 5 and 11 are given in a travel (s)/voltage (U) diagram corresponding to FIG. 4. Given a pitch of $D_1=1.2 \, L=1.2 \, D_o$ of the driver spindle 12 in comparison with $D_o=L$ of the spindle rod 1, a congruent signal evaluation in terms of the measurement signals from the two sensors 5 and 11 is established only after the displacement travel of the spindle rod 1 of $D=6 \, L$. This means that, within the region D given a superimposition of the signal evaluations of the two sensors 5, 11, it is possible to assign a unique value to each displacement travel which the spindle rod undergoes. The region D within which this is possible is calculated from $D=D_o+[D_o: (D_1-D_o)]$. The result of this is that the value of D increases as the difference between $D_1$ and $D_o$ decreases. Given a small difference in pitch between the two spindles 1 and 12, it is thus possible to achieve a relatively large region D within which absolutely defined spindle positions can be registered directly.

Given a spindle drive which is virtually free of play, the magneto-resistive sensor 5 may also be used, inter alia, to commutate the servomotor 4. As a result, it is possible to dispense with the need for a sensor which is otherwise necessary for the commutation. Since the magneto-resistive sensor can be executed on a very small scale, within the spindle drive it can be installed directly on or within the servomotor 4. A magneto-resistive sensor 5 according to the invention measures only a few millimetres in each direction, specifically including the permanent magnet which, as a rule, is directly connected to said sensor 5. With the measurement signals of the sensor 5, it is possible to control the spindle drive electronically both in terms of open-loop and closed-loop control.

What is claimed is:

1. Linear drive having a device for registering the displacement travel and/or the displaced position of a magnetizable sliding component (1), which is moved free of torsion, of this linear drive with at least two magneto-resistive sensors (5) within a magnetic field which is influenced by the sliding component (1), the registering of measured values and evaluation of the sensor (5) being aligned with a surface profile of the sliding component (1) which has, in the direction of displacement, sections which follow one another in the same way and which each have an identical form in this direction such that each displaced position of a section which migrates through the magnetic field generates within this magnetic field a different magnetic field characteristic-value which can be registered by the sensor (5), characterized in that this device comprises at least two magneto-resistive sensors (5), one of which is matched to a first type of profiling of the sliding component (1), which type of profiling is regular in the longitudinal direction of displacement, and the at least one other magnato-resistive sensor (5) is assigned to a different second type of profiling of the sliding component (1), which type of profiling is regular in the direction of displacement and follows the first type of profiling in the direction of displacement, the two sensors (5) each lying within an associated magnetic field which is influenced by the sliding component (1) and its position, and the sliding component (1) being additionally implemented as a spindle or sleeve which is provided with a grooved or threaded drive profile which forms the first type of profiling.

2. Linear drive according to claims 1, characterized in that, when the sliding component (1) is driven by means of an electric servomotor (4), this device generates commutation signals for this servomotor (4).

3. Linear drive according to claims 1, characterized in that a drive which causes the sliding component (1) to be displaced can be controlled in open-loop and/or closed-loop terms with this device.

* * * * *